(12) United States Patent
Wehmeyer

(10) Patent No.: US 6,348,565 B1
(45) Date of Patent: Feb. 19, 2002

(54) METHOD FOR PREPARING METAL CYANIDE CATALYSTS USING SILANE-FUNCTIONAL LIGANDS

(75) Inventor: Richard M. Wehmeyer, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/574,842

(22) Filed: May 19, 2000

(51) Int. Cl.$^7$ .................... C08G 59/68; B01J 27/26; B01J 21/00
(52) U.S. Cl. .................. 528/409; 528/410; 528/412; 528/414; 528/415; 502/102; 502/158; 502/152; 502/175; 502/240; 502/241; 502/250; 502/254; 502/258; 502/260; 502/439; 502/506
(58) Field of Search .................. 502/102, 152, 502/158, 175, 240, 258, 260, 241, 254, 250, 439, 506; 528/409, 410, 412, 414, 415

(56) References Cited

U.S. PATENT DOCUMENTS

| 4,477,589 A | 10/1984 | Van der Hulst et al. .... 502/169 |
| 5,290,912 A | * 3/1994 | Watabe et al. .............. 528/405 |
| 5,627,120 A | 5/1997 | Le-Khac ..................... 502/156 |
| 5,639,705 A | 6/1997 | Bowman et al. ............ 502/175 |
| 5,998,327 A | 12/1999 | Hofmann et al. ........... 502/175 |
| 6,051,680 A | 4/2000 | Faraj .......................... 528/412 |

FOREIGN PATENT DOCUMENTS

| EP | 0 485 637 A1 | 5/1992 | .................... 65/26 |
| WO | 99/44739 | 9/1999 | ........... B01J/27/26 |

OTHER PUBLICATIONS

U.S. application No. 09/574,845, Laycock et al., filed May 19, 2000.
U.S. application No. 09/574,847, Wehmeyer, filed May 19, 2000.
U.S. application No. 09/574,848, Wehmeyer, filed May 19, 2000.
English Abstract of JP 04351632, Yamada et al., Japan, Dec. 7, 1992.

* cited by examiner

*Primary Examiner*—Robert Dawson
*Assistant Examiner*—Jeffrey B. Robertson

(57) ABSTRACT

Complexes of a metal cyanide polymerization catalyst and certain silane-functional complexing agents provide a method whereby supported, active metal cyanide catalysts can be prepared. The catalysts are useful alkylene oxide polymerization catalysts that are easily separated from the polymerization product and recycled.

31 Claims, No Drawings

METHOD FOR PREPARING METAL CYANIDE CATALYSTS USING SILANE-FUNCTIONAL LIGANDS

BACKGROUND OF THE INVENTION

This invention relates to metal cyanide complexes. More particularly, it relates to metal cyanide catalysts having specific complexing agents, to heterogeneous metal cyanide catalysts, and to methods for polymerizing alkylene oxides in the presence of a metal cyanide catalyst.

Polyethers are prepared in large commercial quantities through the polymerization of alkylene oxides such as propylene oxide and ethylene oxide. The polymerization is usually conducted in the presence of an initiator compound and a catalyst. The initiator compound usually determines the functionality (number of hydroxyl groups per molecule) of the polymer and in some instances incorporates some desired functional groups into the product. The catalyst is used to provide an economical rate of polymerization.

Metal cyanide complexes are becoming increasingly important alkylene oxide polymerization catalysts. These complexes are often referred to as "double metal cyanide" or "DMC" catalysts, and are the subject of a number of patents. Those patents include, for example, U. S. Pat. Nos. 3,278,457, 3,278,458, 3,278,459, 3,404,109, 3,427,256, 3,427,334, 3,427,335 and 5,470,813, among many others. In some instances, these metal cyanide complexes provide the benefit of fast polymerization rates and narrow polydispersities. Additionally, these catalysts sometimes are associated with the production of polyethers having very low levels of monofunctional unsaturated compounds.

The most common of these metal cyanide complexes, zinc hexacyano-cobaltate (together with the proper complexing agent and an amount of a poly(propylene oxide)), has the advantages of being active and of forming poly(propylene oxide) having very low unsaturation. However, the catalyst is quite difficult to remove from the product polyether. Because of this difficulty, and because the catalyst can be used in small amounts, the usual practice is to simply leave the catalyst in the product. However, this means that the catalyst must be replaced. In addition, the presence of the residual catalyst in the polyether product has been reported to cause certain performance problems. These include poor storage stability and, in some instances, interference with downstream processes. In order to reduce catalyst expense and to avoid these problems, it would be desirable to provide a catalyst that can be recovered easily from the product polyether.

SUMMARY OF THE INVENTION

In one aspect, this invention is a water insoluble metal cyanide catalyst that is complexed with a silane-functional complexing agent.

In a second aspect, this invention is an organosilicone polymer having pendant heteroatom-containing groups that are complexed with a water insoluble metal cyanide catalyst.

In a third aspect, this invention is a supported catalyst complex comprising a water-insoluble metal cyanide coupled to a support through a silane coupling agent containing a heteroatom-containing functional group that is complexed with said metal cyanide.

In a fourth aspect, this invention is a supported catalyst comprising a support having coated thereon a polymer containing repeating units derived from a complex of a water insoluble metal cyanide and a silane-functional complexing agent.

In a fifth aspect, this invention is a method of polymerizing an alkylene oxide, comprising contacting said alkylene oxide with an initiator compound under polymerization conditions with a polymer containing repeating units derived from a complex of a water insoluble metal cyanide and a silane-functional complexing agent.

DETAILED DESCRIPTION OF THE INVENTION

The complex of the invention includes a water insoluble metal cyanide catalyst. These metal cyanide catalysts are well known, and are often referred to as "double metal cyanide" or "MC" catalysts because in most instances these complexes include two different metal ions. The metal cyanide catalysts can be represented by the general formula

$$M_b[M^1(CN)_r(X)_t]_c[M^2(X)_6]_d \cdot nM^3_xA_y,$$

wherein M is a metal ion that forms an insoluble precipitate with the $M^1(CN)_r(X)_t$ group and which has at least one salt which is soluble in water or an organic compound as described below;

$M^1$ and $M^2$ are transition metal ions that may be the same or different;

each X independently represents a group other than cyanide that coordinates with an $M^1$ or $M^2$ ion;

$M^3_xA_y$ represents a salt of metal ion $M^3$ and anion A which is soluble in water or an organic compound as described below, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2; and n is a positive number (which may be a fraction) indicating the relative quantity of $M^3_xA_y$.

The X groups in any $M^2(X)_6$ do not have to be all the same. The molar ratio of c:d is advantageously from about 100:0 to about 20:80, more preferably from about 100:0 to about 50:50, and even more preferably from about 100:0 to about 80:20.

The term "metal salt" is used herein to refer to a salt of the formula $M_xA_y$ or $M^3_xA_y$, where M, $M^3$, x, A and y are as defined above.

M and $M^3$ are preferably metal ions selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+2}$ and $Cr^{+3}$. M and $M^3$ are more preferably $Zn^{+2}$, $Fe^{+2}$, $Co^{+2}$, $Ni^{+2}$, $La^{+3}$ and $Cr^{+3}$. M is most preferably $Zn^{+2}$.

$M^1$ and $M^2$ are preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred. $M^1$ and $M^2$ may be the same or different.

Preferred groups X include anions such as halide (especially chloride), hydroxide, sulfate, carbonate, oxalate, thiocyanate, isocyanate, isothiocyanate, $C_{1-4}$ carboxylate and nitrite ($NO_2$—), and uncharged species such as CO, $H_2O$ and NO. Particularly preferred groups X are NO, $NO_2$— and CO.

r is preferably 5 or 6, most preferably 6 and t is preferably 0 or 1, most preferably 0. In many cases, r+t will equal six.

Suitable anions A include halides such as chloride and bromide, nitrate, sulfate, carbonate, cyanide, oxalate, thiocyanate, isocyanate, isothiocyanate, perchlorate, an alkanesulfonate such as methanesulfonate, an arylenesulfonate such as p-toluenesulfonate, trifluoromethanesulfonate (triflate) and $C_{1-4}$ carboxylate. Chloride ion is especially preferred.

The metal cyanide catalyst is completed with a complexing agent that contains a hydrolyzable silane coupling group. By "complexed", it is meant that the complexing agent becomes associated with the metal cyanide catalyst. The nature of the complexing is not fully understood, and may be due to a combination of factors. The completing may be due to the formation of a coordinate bond between a heteroatom on a functional group of the complexing agent and one or more of the metal ions $(M, M^1, M^2, M^3)$ of the metal cyanide catalyst. Another explanation of the complexing is that it is due to the complexing agent occupying vacancies within the crystalline structure of the metal cyanide, or that it otherwise is occluded within or bound into the crystalline lattice. However, it is not intended to limit this invention to any particular complexing mechanism.

The complexing agent has at least one hydrolyzable silane group that is linked to a group having at least one functional moiety through which the complexing agent can be complexed with the metal catalyst. The functional moiety advantageously contains at least one heteroatom that is preferably selected from oxygen, nitrogen, phosphorous, and sulfur. The heteroatom is most preferably oxygen. The functional moiety can be, for example, a sulfide, a sulfoxide, a sulfone, a phosphonate, a urethane, a urea, an amide, a nitrile, an alcohol, an aldehyde, a ketone, an ether or an ester group. Preferred functional groups include alcohols and ethers, or a combination of these.

Thus, preferred complexing agents can be represented as having the general structure

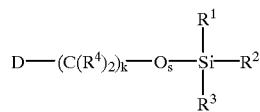

where D is a heteroatom containing group as described above, k is a positive number, s is zero or one, each $R^4$ is independently hydrogen or an alkyl, aryl or alkoxyl group that may be substituted, $R^1$ is a hydrolyzable group and $R^2$ and $R^3$ are groups that may be hydrolyzable or nonhydrolyzable. One or both of $R^2$ and $R^3$ may be another —$O_s$—$(C(R^4)_2)_k$—D linkage. Similarly, D may contain another —$(C(R^4)_2)_k$—$O_s$—$Si(R_1R_2R_3)$ group. Preferably at least one of $R^2$ and $R^3$ are hydrolyzable and more preferably both $R^2$ and $R^3$ are hydrolyzable. Preferred hydrolyzable groups include halogen, particularly chlorine, $C_{1-8}$ alkoxyl, or substituted alkoxyl. $R^1$ is preferably chloro, methoxy or ethoxy, as is at least one of $R^2$ and $R^3$. When s is one, the nature of the Si—O—$(C(R^4)_2)_k$—D linkage is such that the oxygen-silicon bond is substantially less susceptible to hydrolysis than $R^1$ (and $R^2$ and $R^3$ when they are hydrolyzable). This permits selective hydrolysis of the $R^1$ (and $R^2$ and $R^3$ groups when hydrolyzable) without substantial hydrolysis of the D—$C(R^4)_2)_k$—O— group. k is preferably 1–500, more preferably 1–10. s is preferably zero in all cases.

One preferred class of groups D is those having polyether segments. Polyether segments of particular interest are derived from ethylene oxide, propylene oxide, butylene oxide, or mixtures of two or more of these, and have a weight (number average) of from about 100 daltons, preferably from about 200 daltons, to about 8000 daltons, preferably to about 3000 daltons, more preferably to about 2000 daltons. Some complexing agents of this type are represented as:

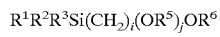

wherein i is zero or a positive number, j is a positive number, $R^5$ is an alkylene group which may be substituted and $R^6$ is hydrogen, an organic group, or a —$(CH_2)_iSiR^1R^2R^3$ group. The $OR^5$ groups are preferably residues from polymerizing ethylene oxide, propylene oxide, 1,2-butylene oxide, styrene oxide, tetramethylene oxide or mixtures of two or more thereof. $R^6$ is preferably a $C_{1-4}$ straight chain or branched alkyl group or a —$(CH_2)_iSiR^1R^2R^3$ group. j is from 1 to about 200, preferably from about 5 to about 100, more preferably from about 5 to about 50. i is preferably from about 1 to about 12, more preferably from about 1 to about 4. Especially preferred complexing agents of this type are those in which i is about 1–4, the $OR^5$ groups are residues of ethylene oxide, propylene oxide, 1,2-butylene oxide or tetramethylene oxide, and j is about 5 to about 50, $R^6$ is $C_{1-4}$ alkyl or —$(CH_2)_iSiR^1R^2R^3$ (where i is again about 1–4) and $R^1$, $R^2$ and $R^3$ are all methoxy or ethoxy groups.

Other preferred complexing agents include polyether segments that are connected to the terminal —$(C(R^4)_2)_k$—$O_s$—$SiR^1R^2R^3$ group(s) through a linking group such as a urethane, urea or similar group. For example, a urethane-linked complexing agent can be prepared in the reaction of an isocyanate-functional silane compound with a hydroxyl-terminated polyether. The isocyanate group is preferably bound to the silicon atom through a non-hydrolyzable linkage, and the silicon atom is bound to groups $R^1$, $R^2$ and $R^3$ as described before. Thus, suitable isocyanate-functional silane compounds include those represented by the structure OCN—G—$(C(R^4)_2)_k$SiR$^1$R$^2$R$^3$ where k, $R^1$, $R^2$, $R^3$ and $R^4$ are as previously defined and G is a chemical bond or a linking group. The isocyanate-functional silane compound can be reacted with a hydroxyl- or amine-functional polyether to produce the desired silane-functional complexing agent. If desired, the hydroxyl- or amine-functional polyether may contain more than one isocyanate-reactive group, so that multiple —$(C(R^4)_2)_k$SiRR$^2$R$^3$ groups can be introduced onto the complexing agent. The polyether advantageously has a molecular weight of about 100 to about 8000, preferably about 2500–4000, more preferably about 300–2500, and may be, for example, a polymer of ethylene oxide, propylene oxide, 1,2-butylene oxide, styrene oxide, tetramethylene oxide or mixtures of two or more thereof.

Another way to produce a complexing agent having urethane or urea linking groups is to react a hydroxyl- or amine-functional silane compound with a polyether that contains one or more terminal isocyanate groups. The hydroxyl or amine groups preferably are bound to the silicon atom through a non-hydrolyzable linkage, and the silicon atom is bound to groups $R^1$, $R^2$ and $R^3$ as before. Thus, suitable hydroxyl- or amine-functional silane compounds include those represented by the structures HO—G—$(C(R^4)_2)_k$SiR$^1$R$^2$R$^3$ and HR$^4$N—G—$(C(R^4)_2)_k$SiR$^1$R$^2$R$^3$, where k, $R^1$, $R^2$, $R^3$, $R^4$ and G are as previously defined. Polyethers having terminal isocyanate groups are easily prepared by reacting a hydroxyl or amine-terminated polyether with at least a stoichiometric quantity of a di- or polyisocyanate. Suitable di- or polyisocyanates include aromatic, aliphatic and cycloaliphatic types, including diphenylmethane diisocyanate, polymethylene polyphenylene polyisocyanates, toluene diisocyanate, H12MDI, isophorone diisocyanate, 1,6-hexane diisocyanate, and the like. As before, the starting polyether advantageously has a molecular weight of about 100 to about 8000, preferably about 2500–4000, more preferably about 300–2500, and may be, for example, a polymer of ethylene oxide, propylene oxide, 1,2-butylene oxide, styrene oxide, tetramethylene oxide or mixtures of two or more thereof.

Another preferred type of complexing agent is a reaction product of an epoxy-functional silane and an alcohol. The epoxy group preferably is bound to the silicon atom through a non-hydrolyzable linkage, and the silicon atom is bound to groups $R^1$, $R^2$ and $R^3$ as before. Thus, suitable epoxy-functional silane compounds include those represented by the structure $Ep-G-(C(R^4)_2)_k SiR^1 R^2 R^3$, where k, $R^1$, $R^2$, $R^3$ $R^4$ and G are as previously defined and Ep represents an epoxy group. Suitable alcohols include aliphatic alcohols having from about 1 to about 20 carbon atoms or more, and also include hydroxyl-terminated ethers and polyethers, such as those described before. Complexing agents of this type are conveniently prepared by reacting the epoxy-functional silane compound with the alcohol, typically in the presence of heat and a suitable catalyst such as boron trifluoride, and under conditions such that the $R^1$, $R^2$ and $R^3$ groups are not hydrolyzed.

Thus, the complexed metal cyanide catalyst can be described as being represented by the general formula

where L represents the silane-functional complexing agent and z is a positive number representing the relative quantity of complexed L molecules. A quantity of water or additional complexing agent may also be bound into the complex. Among the catalysts of particular interest are:

Zinc hexacyanocobaltate.$zL.nZnCl_2$;

$Zn[Co(CN)_5NO].zL.nZnCl_2$;

$Zn_s[Co(CN)_6]_o[Fe(CN)_5NO]_p.zL.nZnCl_2$ (o, p=positive numbers, s=1.5o+p);

$Zn_s[Co(CN)_6]_o[Co(NO_2)_6]_p[Fe(CN)_5NO]q. zL.nZnCl_2$ (o, p, q=positive numbers, s=1.5(o+p)+q);

Zinc hexacyanocobaltate.$zL.nLaCl_3$;

$Zn[Co(CN)_5NO].zL.nLaCl_3$;

$Zn[Co(CN)_6]_o[Fe(CN)_5NO]_p.zL.nLaCl_3$ (o, p=positive numbers, s=1.5o+p);

$Zn_s[Co(CN)_6]_o[Co(NO_2)_6]_p[Fe(CN)_5NO]_q. zL.nLaCl_3$ (o, p, q=positive numbers, s=1.5(o+p)+q);

Zinc hexacyanocobaltate.$zL.nCrCl_3$;

$Zn[Co(CN)_5NO].zL.nCrCl_3$;

$Zn_s[Co(CN)_6]_o[Fe(CN)_5NO]_p.zL.nCrCl_3$ (o, p=positive numbers, s=1.5o+p);

$Zn_s[Co(CN)_6]_o[Co(NO_2)_6]_p[Fe(CN)_5NO]_q. zL.nCrCl_3$ (o, p, q=positive numbers, s=1.5(o+p)+q);

Magnesium hexacyanocobaltate.$zL.nZnCl_2$;

$Mg[Co(CN)_5NO].zL.nZnCl_2$;

$Mg_s[Co(CN)_6]_o[Fe(CN)_5NO]_p.zL.nZnCl_2$ (o, p=positive numbers, s=1.5o+p);

$Mg_s[Co(CN)_6]_o[Co(NO_2)_6]_p[Fe(CN)_5NO]_q.zL.nZnCl_2$ (o, p, q=positive numbers, s=1.5(o+p)+q);

Magnesium hexacyanocobaltate.$zL.nLaCl_3$;

$Mg[Co(CN)_5NO].zL.nLaCl_3$;

$Mg_s[Co(CN)_6]_o[Fe(CN)_5NO]_p.zL.nLaCl_3$ (o, p=positive numbers, s=1.5o+p);

$Mg_s[Co(CN)_6]_o[Co(NO_2)_6]_p[Fe(CN)_5NO]_q.zL.nLaCl_3$ (o, p, q=positive numbers, s=1.5(o+p)+q);

Magnesium hexacyanocobaltate.$zL.nCrCl_3$;

$Mg[Co(CN)_5NO].zL.nCrCl_3$;

$Mg_s[Co(CN)_6]_o[Fe(CN)_5NO]_p.zL.nCrCl_3$ (o, p=positive numbers, s=1.5o+p);

$Mg_s[Co(CN)_6]_o[Co(NO_2)_6]_p[Fe(CN)_5NO]_q.zL.nCrCl_3$ (o, p, q=positive numbers, s=1.5(o+p)+q);

as well as the various complexes such as are described at column 3 of U.S. Pat. No. 3,404,109, incorporated herein by reference.

There are several convenient methods by which the silane-functional complexing agent can be complexed with the metal cyanide catalyst. In general, these processes include the steps of precipitating the metal cyanide catalyst from solutions of certain soluble metal salts and a soluble metal cyanide compound, and contacting the precipitate with the silane-functional complexing agent. The contacting with the complexing agent can be done during or after the initial precipitation of the metal cyanide catalyst. In addition, the silane-functional complexing agent can be formed in situ after the precipitation of the metal cyanide catalyst, as described below.

Aqueous preparation techniques can also be used, particularly when the silane-functional complexing agent is water miscible.

A convenient method is to precipitate the metal cyanide catalyst from a solution of the starting materials in an organic compound, in the presence of the silane-functional complexing agent. In this method, a solution or dispersion of a compound is mixed with a solution or dispersion of a metal salt. The solvent or dispersant includes an organic compound as described below. The soluble metal cyanide compound is represented by the general formula $H_w[M^1(CN)_r(X)_t]$, in which $M^1$, X, r and t are as described before and w equals the absolute value of the $[M^1(CN)_r(X)_t]$ group. If desired, a solution of a compound of the general formula $H_wM^2(X)_6$ may be included, either as part of the soluble metal cyanide compound solution or as a separate solution.

The organic compound is one that meets several requirements. First, it does not react with the soluble metal cyanide compound or any $H_wM^2(X)_6$ compounds that may be present. In addition, it does not react with the metal salt. It is not a solvent for the metal cyanide catalyst complex that is formed in the reaction of the metal salt and the soluble metal cyanide compound. Preferably, the organic compound is a solvent for the soluble metal cyanide compound and any $H_wM^2(X)_6$ compounds that may be used. In addition, the organic compound preferably is miscible with the silane-functional complexing agent. Even more preferably, the organic compound is relatively low boiling or otherwise easily separated from the silane-functional complexing agent. A preferred organic compound is methanol.

In the organic solution method just described, it is preferred to minimize or even eliminate water during formation of the DMC complex.

A solution of the metal cyanide compound in the organic compound can be prepared in several ways. In one preparation technique, an aqueous solution of the corresponding alkali metal cyanide salt (i.e., $B_w[M^1(CN)_r(X)_t]$, where B represents an alkali metal ion) is formed. This may be done at an elevated temperature if necessary to dissolve the metal cyanide salt. The aqueous solution is mixed with a stoichiometric excess of a concentrated mineral acid of the form $H_dJ$, where J is an anion that forms an insoluble salt with B and d is the absolute value of the valence of J. Common mineral acids such as sulfuric acid and hydrochloric acid are preferred. Sulfuric acid is preferably used at a 75% or higher concentration. Hydrochloric acid is preferably used at a 30% or higher concentration, preferably about a 37% concentration. The salt of B and J precipitates, leaving the desired soluble metal cyanide compound $H_w[M^1(CN)_r(X)_t]$ in aqueous solution. The organic compound is then added, usually with stirring, preferably at a slightly elevated temperature in order to maintain the $H_w[M^1(CN)_r(X)_t]$ compound in solution. Because the salt of B and J is usually hygroscopic, a significant portion of the water is removed from the solution with the salt. The salt is easily separated from the supernatant liquid by filtration, centrifuging or other solid-liquid separation technique. If desired, the salt may be washed with additional quantities of the organic compound in order to recover any occluded $H_w[M^1(CN)_r(X)_t]$ compound.

A second method for preparing the solution of the soluble metal cyanide compound is to first form a slurry of the corresponding alkali metal cyanide salt (i.e., $B_w[M^1(CN)_r(X)_t]$), in a mixture of the organic compound and a stoichiometric excess of a mineral acid, preferably hydrochloric acid. The hydrochloric acid can be supplied in various ways, such as by adding concentrated aqueous HCl, introducing gaseous HCl into the organic compound, or by adding a solution of HCl in an appropriate solvent (such as diethyl ether or isopropanol). An alkali metal salt of the acid forms and precipitates from the solution, leaving the desired $H_w[M^1(CN)_r(X)_t]$ compound dissolved in the organic compound. The precipitate is separated and if desired washed, as before.

A third convenient method of preparing the solution of the soluble metal cyanide compound is by ion exchange. An aqueous solution of the corresponding alkali metal salt (i.e., $B_w[M^1(CN_r(X)_t])$ is eluted through a cation exchange resin or membrane which is originally in the hydrogen ($H^+$) form. Sufficient resin is used to provide an excess of $H^+$ ions. Suitable ion exchange resins include commonly available gel or macroporous, crosslinked polystyrene cation exchange resins, such as those sold by The Dow Chemical Company under the trade names DOWEX® MSC-1, DOWEX® 50WX4, as well as AMBERLYST® 15 ion exchange resin, sold by Rohm & Haas. The column is typically eluted with water until the desired soluble metal cyanide compound is recovered. The water is removed from the eluent, yielding the desired soluble metal cyanide compound as solid precipitate. This precipitate is then dissolved or dispersed in the organic compound. If desired, a small amount of water may be left in the soluble metal cyanide compound when it is mixed with the organic compound.

Other ion exchange methods for preparing the solution are described by F. Hein et al., *Z. Anorg. Allg. Chem.* 270, 45 (1952) and A Ludi et al, *Helv. Chem. Acta* 50, 2035 (1967). Yet other methods are described by Klemm et aL, *Z. Anorg. Allg. Chem.* 308, 179 (1961) and in the *Handbook of Preparative Inorganic Chemistry*, G. Brauer, Ed., Ferdinand Enke Verlag, Stuttgart, 1981.

The $H_wM^2(X)_6$ compound can be made in an analogous way.

The solution of the metal salt usually can be prepared by directly dissolving the metal salt into an organic compound. The organic compound is as described above. In this solution, the organic compound is preferably the same as used in the soluble metal cyanide compound solution. If a different organic compound is used, it is preferably miscible with that used in the soluble metal cyanide compound solution.

The solutions are mixed in proportions such that an excess of the metal salt is provided, based on the amount of soluble metal cyanide compound. Preferably about 1.5 to about 4, more preferably from about 2 to about 3 moles of metal ion (M) are delivered per mole of $M^1(CN)_r(X)_t$ ion (or combined moles of $M^1(CN)_r(X)_t$ and $M^2(X)_6$ ions, when $M^2(X)_6$ ions are present). It is also preferred that the mixing be done with agitation. Agitation is preferably continued for a period after the mixing is completed. The metal cyanide catalyst, $M_b[M^1(CN)_r(X)_t]_c[M^2(X)_6]_d$, precipitates and forms a fine dispersion in the organic compound.

The silane-functional compound is conveniently introduced into the complex by including it in one of the starting solutions or by adding it to the resulting dispersion, preferably immediately after the starting solutions are mixed. Less preferably, the silane-functional complexing agent (or solution thereof in a non-aqueous solvent) can be used to wash the precipitated metal cyanide catalyst. The silane-functional complexing agent can also be formed in-situ as described more below.

If desired, other complexing agents can be used in addition to the silane-functional complexing agent. If used, the additional complexing agent can be added in the same manner as the silane-functional complexing agent. A great number of complexing agents are potentially useful, although catalyst activity may vary according to the selection of a particular complexing agent. Examples of such complexing agents include alcohols, aldehydes, ketones, ethers, amides, nitrites, sulfides, and the like.

Preferred additional complexing agents are t-butanol, 1-t-butoxy-2-propanol, polyether polyols having an equivalent weight of about 75–350 and dialkyl ethers of alkylene and polyalkylene glycols. Especially preferred complexing agents are t-butanol, 1-t-butoxy-2-propanol, polyether polyols having an equivalent weight of 125–250 and a dimethyl ether of mono-, di- or triethylene glycol. t-Butanol and glyme (1,2-dimethoxy ethane) are especially preferred.

In addition, a binder as described further below can be added with the silane-functional complexing agent.

The metal cyanide catalyst/silane-functional complexing agent dispersion (containing additional complexing agent and/or binder, if desired) is conveniently formed into a shaped polymer by casting, spraying or similar methods, followed by curing. If desired, the dispersion may include a solvent, such as the organic compounds discussed above, in order to reduce viscosity and facilitate the shaping process. This solvent is also most advantageously removed during the curing process.

Curing is performed by contacting the dispersion with enough water to hydrolyze the $R^1$ groups and those of the $R^2$ and $R^3$ groups that are hydrolyzable. While not intending to be bound by any theory, it is believed that the hydrolyzable groups initially undergo hydrolysis to Si—OH groups. Next, these Si—OH undergo hydrogen bonding to each other (and the surface of certain supports, if present). The Si—OH groups then condense (with loss of water) to create Si—O—Si bonds between silane-functional complexing agent molecules or Si—O-surface bonds. Thus, in this invention, the term "organosilicone" polymer is used in a broad sense to include polymers having alternating silicon and oxygen atoms, and in which the silicon atoms are substituted with organic radicals. At least some of the silicon atoms that are substituted with organic radicals are derived from the silane-functional ligand.

This "curing" process can be done at ambient or elevated temperatures. The rate and degree of curing is controlled through the rate at which water is removed from the mixture. The water is typically added prior to casting or spraying the dispersion, preferably during or more preferably after precipitating the catalyst. As a certain amount of water is present in the reagent solutions, it may not be necessary to provide additional water. Alternately, the water for hydrolysis can be provided as intrinsic water contained within a support, or may applied to the dispersion after it is cast or sprayed.

The cured polymer advantageously contains from about 1, preferably from about 5, more preferably from about 10, especially from about 20 weight percent, to about 75, preferably to about 65, more preferably to about 50 weight percent of metal cyanide catalyst. In this context, the weight of the metal cyanide catalyst is considered to be the weight of the $M_b[M^1(CN)_r(X)_r]_c[M^2(X)_6]_d \cdot nM^3_xA_y$ material, exclusive of any associated water or complexing agent compounds.

A supported catalyst is easily prepared by forming the polymer onto the surface of a suitable support. Supports can be organic or, preferably, inorganic materials. Organic supports include polyacrylate or styrene copolymer particles, especially when crosslinked. Inorganic supports include, for example, oxides, carbides, nitrides or metals. Examples of oxides are oxides of metals of groups IIA to IVA and IB to VIIIB, especially alumina and silica. Examples of carbides include silicon carbide, boron carbide and tungsten carbide. Examples of nitrides include boron nitride, silicon nitride or aluminum nitride. Metal supports include metals and metal alloys such as steel, aluminum, noble metals, nickel, stainless steel, titanium, tantalum and canthal. Especially preferred supports are those that can form an Si—O—X bond to the silane-functional completing agent, where X refers to an atom bound onto the support. Some supports of particular interest include silica gel (especially in particulate form, such as from about 60–200 mesh (U.S. Sieve)), silica chips (such as, e.g. from about 6 to about 200 mesh), alumina particulates or spheres, porous alumina spheres or particulates, polyacrylate or styrene/divinylbenzene copolymer particles, catalyst substrate spheres, and the like. Particulate supports provide the advantages of having large surface areas and being easily separated from a polyether made using the supported catalyst. However, the support may also be the interior surface of a reaction vessel such as a pipe or tubular reactor, a screen, honeycomb or other structure inserted within the reaction vessel, or the like.

To form a supported catalyst, the dispersion containing the precipitated catalyst and silane-functional completing agent is subjected to hydrolysis conditions as described before in the presence of the support.

Supported catalysts according to the invention advantageously contain from about 1, preferably from about 3, more preferably from about 5, especially from about 20 weight percent, to about 50, preferably to about 25, more preferably to about 15 weight percent of metal cyanide catalyst. As before, the weight of the metal cyanide catalyst is considered to be the weight of the $M_b[M^1(CN)_r(X)_r]_c[M^2(X)_6]_d \cdot nM^3_xA_y$ material, exclusive of any associated water or complexing agent compounds.

If desired, a binder can be present when the silane-functional completing agent is hydrolyzed to form the polymer. This is especially desirable when the polymer is formed onto a support. Suitable binders include, for example, esters of silicic acid (such as a tetra alkyl orthosilicate), borates, aluminates (especially aluminum alkosides), titanates (especially titanium alkoxides) and/or zirconates. Esters of silicic acid that do not have a heteroatom-containing functional group (other than the silane group itself) are preferred, as these are capable of forming Si—O—Si bonds with the silane-functional complexing agent to form a copolymer. Particularly preferred binders are tetraethyl orthosilicate and tetramethyl orthosilicate.

It is possible in some instances to form the silane-functional complexing agent in situ in the presence of the precipitated catalyst. For example, a silane-functional complexing agent prepared by reacting an isocyanate-terminated polyether and a hydroxyl-terminated silane can be created by precipitating the catalyst in the presence of the isocyanate-terminated polyether. The hydroxyl-terminated silane compound can be added to the resulting dispersion (together with a suitable catalyst if desired) and caused to react with the isocyanate-terminated polyether to form the silane-functional complexing agent in the presence of the precipitated catalyst. This reaction can be conducted simultaneously with the curing of the polymer, so that the formation of the silane-functional complexing agent and the polymer is performed in a single step. As before, this can be done in the presence of a suitable support.

In analogous manner, the catalyst can be precipitated in the presence of an alcohol, and the resulting dispersion mixed with an epoxy-functional silane or an isocyanate-functional silane that can be reacted with the alcohol to form the silane-functional completing agent in situ. However, water should not be present when an isocyanate-functional silane is used in this manner, in order to avoid formation of urea compounds and generation of carbon dioxide.

The catalyst complex of the invention is used to polymerize alkylene oxides to make polyethers. In general, the process includes mixing a catalytically effective amount of the catalyst with an alkylene oxide under polymerization conditions, and allowing the polymerization to proceed until the supply of alkylene oxide is essentially exhausted. The concentration of the catalyst is selected to polymerize the alkylene oxide at a desired rate or within a desired period of time. An amount of polymer or supported catalyst as described above sufficient to provide from about 5 to about 10,000 parts by weight metal cyanide catalyst (calculated as $M_b[M^1(CN)_r(X)_r]_c[M^2(X)_6]_d \cdot nM^3_xA_y$, exclusive of supports and any associated water or complexing agent compounds) per million parts combined weight of alkylene oxide and initiator and comonomers, if present. More preferred catalyst levels are from about 20, especially from about 30, to about 5000, more preferably about 1000 ppm, even more preferably about 100 ppm, on the same basis.

For making high molecular weight monofunctional polyethers, it is not necessary to include an initiator compound. However, to control molecular weight, impart a desired functionality (number of hydroxyl groups/molecule) or a desired terminal functional group, an initiator compound as described before is preferably mixed with the catalyst complex at the beginning of the reaction. Suitable initiator compounds include monoalcohols such methanol, ethanol, n-propanol, isopropanol, n-butanol, isobutanol, t-butanol, 1-t-butoxy-2-propanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol and the like. The suitable monoalcohol initiator compounds include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols. Suitable polyalcohol initiators include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such a methyl glucoside and ethyl glucoside and the like. Low molecular weight polyether polyols, particular those having an equivalent weight of about 350 or less, more preferably about 125–250, are also useful initiator compounds.

Among the alkylene oxides that can be polymerized with the catalyst complex of the invention are ethylene oxide, propylene oxide, 1,2-butylene oxide, styrene oxide, and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide along or a mixture of at least 75 weight % propylene oxide and up to about 25 weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109, and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be polymerized with the catalyst of the invention.

The polymerization reaction typically proceeds well at temperatures from about 25 to about 150° C., preferably from about 80–130° C. A convenient polymerization technique involves mixing the catalyst complex and initiator, and pressuring the reactor with the alkylene oxide. After a short induction period, polymerization proceeds, as indicated by a loss of pressure in the reactor. Once the polymerization has begun, additional alkylene oxide is conveniently fed to the reactor on demand, until enough alkylene oxide has been added to produce a polymer of the desired equivalent weight.

Another convenient polymerization technique is a continuous method. In such continuous processes, an initiator is continuously fed into a continuous reactor, such as a continuously stirred tank reactor (CSTR) or a tubular reactor that contains the catalyst. A feed of alkylene oxide is introduced into the reactor and the product continuously removed.

The catalyst of this invention is easily separated from the product polyether by any convenient solid-liquid separation, including simple filtration and centrifuging. The recovered catalyst can be re-used in further polymerization reactions.

The recovered catalyst may be washed one or more times, preferably multiple times, with water or preferably an organic solvent such as methanol, and then dried prior to being re-used. If the surface of the catalyst becomes fouled or coated with polymer, the catalyst may be washed or treated to remove the fouling or polymer coating.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably to about 4000, more preferably to about 2500, and unsaturation of no more than 0.02 meq/g, preferably no more than about 0.01 meq/g.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated.

EXAMPLE 1

A. Preparation of $H_3Co(CN)_6$ solution in methanol $K_3Co(CN)_6$ (FW 332.35, 8.0 g, 24.07 mmol) is dissolved with slight warming (40–50° C.) in deionized water (14 g). A solution of 75% $H_2SO_4$ is prepared by slowly adding 96% (concentrated) $H_2SO_4$ (FW 98.08, 3.78 g, 38.5 mmol) to water (1.26 g). The 75% $H_2SO_4$ solution is added slowly dropwise over 5 minutes to the stirred warm solution of $K_3Co(CN)_6$. During the addition, $K_2SO_4$ starts to precipitate from the aqueous solution as a granular white solid. The resultant slurry is stirred for 5–10 min at 50° C.

Methanol addition (75 mL) is then begun at the same temperature. The first 5 mL of methanol is added slowly and the slurry is stirred for 5 minutes. The rest of the methanol charge is then added slowly over 15 minutes. After the full methanol charge is added, the slurry is allowed to stir for 15 minutes, then is cooled to room temperature (25° C.). At this point, the granular $K_2SO_4$ solid (which rapidly settles to the bottom of the reactor) is filtered from the methanol supernatant, which is saved.

The $K_2SO_4$ solid is reslurried in additional methanol (25 mL) for 5 minutes at room temperature. The methanol supernatant is separated as before and combined with that previously saved. A second methanol extraction is performed in the same manner, with the supernatant again being added to that previously saved. The saved pale yellow solution of $H_3Co(CN)_6$ in methanol is transferred to a storage bottle. A very small amount of precipitate settles from this solution, and is separated out.

The final mass of the methanol solution is 109.9 g, which theoretically contains 4.8 wt % $H_3Co(CN)_6$. This methanolic solution contains some small quantity of water, as the $K_2SO_4$ does not completely dry it. The final mass of separated $K_2SO_4$ solid is 6.28 g, after drying for 3 hours @ 50° C. in a vacuum oven. The theoretical mass of the $K_2SO_4$ solid is approximately 6.52 g.

B. Preparation of Supported Catalyst A 13.7 g of the methanolic $H_3Co(CN)_6$ solution of Example 1A (3.01 mmol $H_3Co(CN)_6$) is added dropwise over 10 minutes to a stirred solution of zinc chloride (0.82 g, 6.0 mmol) in methanol (20 mL). A white precipitate forms as soon as the $H_3Co(CN)_6$ addition is begun. Immediately after the $H_3Co(CN)_6$ addition is complete, tert-butanol (10 mL) is added with stirring to the slurry. The resultant slurry is allowed to stir for 1 hour. Then, 3-glycidoxypropyl trimethoxysilane (FW 236.36, 3.31 g, 14.0 mmol) is added to the slurry over 30 minutes. Silica gel (10.0 g, Aldrich grade 62, 60–200 mesh) is then added. The resultant suspension is slowly rotated on a rotoevaporator at 70–75° C. bath temperature while the solvent is slowly distilled under slight vacuum. The vacuum is gradually increased to 25 inches Hg, providing a free-flowing white solid (13.75 g) which is further dried in a vacuum oven at 50° C./30 inches Hg vacuum.

The amount of metal catalyst contained in the product is estimated as follows:

Amount $Zn_{1.5}Co(CN)_6$=3.01 mmol=0.943 g

Amount "excess" $ZnCl_2$=6.00–4.515 mmol=1.485 mmol=0.202 g.

Weight metal catalyst=0.943 g+0.202 g=1.145 g

Weight supported catalyst=13.75 g

% metal catalyst=8.3%

C. Polymerization of Propylene Oxide

Supported Catalyst A is evaluated by mixing 0.12 g of a 700 MW poly(propylene oxide) triol, 0.58 g propylene oxide and a measured amount of the catalyst to a sealed vial, and heating at 90° C. for 18 hours. The conversion of the propylene oxide is then determined as an indication of the activity of the catalyst. The amount of catalyst is expressed in terms of parts of catalyst per million parts of combined weight of initiator and propylene oxide charged to the vial. When 8581 ppm of the supported catalyst (approximately 714 ppm of the metal cyanide catalyst) is used, essentially quantitative conversion of the propylene oxide is seen. The same results are seen when the supported catalyst loading is dropped to 903 ppm (about 75 ppm metal cyanide catalyst).

EXAMPLE 2

A Preparation of Unsupported Metal Cyanide Catalyst Complex 13.7 g of the methanolic $H_3Co(CN)_6$ solution of Example 1A (3.01 mmol $H_3Co(CN)_6$) is added dropwise over 10 minutes to a stirred solution of zinc chloride (0.82 g, 6.0 mmol) in methanol (20 mL). A white precipitate forms as soon as the $H_3Co(CN)_6$ addition is begun. Immediately after the $H_3Co(CN)_6$ addition is complete, 1-tert-butoxy-2-propanol (FW 132.20, 1.15 g, 8.70 mmol) is added with stirring to the slurry. The resultant slurry is allowed to stir for 45 minutes. The methanol is distilled from the slurry on a rotoevaporator at 70–75° C. (25 inches Hg vacuum) with a slight nitrogen sweep. The final product (2.00 g) is a translucent, off-white, hard waxy solid.

B. Preparation of Supported Catalyst B 1.83 g of the solid metal catalyst from Example 2A is suspended in 20 mL of toluene. 3-Glycidoxypropyltrimethoxysilane (FW 236.36, 6.96 g, 29.5 mmol) is added to this suspension in small portions over 1–2 hours. The resultant suspension is stirred with mild heating overnight. The volatiles are then removed by distillation on a rotoevaporator at 70–75° C./30 inches Hg vacuum with a slight nitrogen sweep. The residue (7.08 g) consists of a white solid plus a quantity of a free-flowing liquid. This residue is suspended in methanol (20 mL). Silica gel (6.00 g, Aldrich grade 62, 60–200 mesh) is then added and the resultant suspension is slowly rotated on a rotoevaporator at 70–75° C. bath temperature while the solvent is slowly distilled under slight vacuum and nitrogen sweep. The vacuum is gradually increased to 25 inches Hg, providing a free-flowing white supported catalyst (12.9 g) that is further dried in a vacuum oven at 50° C./30 inches Hg vacuum.

The amount of metal catalyst contained in the product is estimated to be 8.1%, using the method described in Example 1B.

C. Polymerization of Propylene Oxide

Supported Catalyst B is evaluated for activity in same manner as described in Example 1. At a supported catalyst loading of 8572 ppm (about 694 ppm metal cyanide catalyst), 100% conversion of the propylene oxide is seen in 18 hours. When 847 ppm of the supported catalyst (about 69 ppm metal cyanide catalyst) is used, approximately 95% conversion of propylene oxide is seen in 18 hours.

EXAMPLE 3

A. Preparation of Supported Catalyst C 13.7 g of the methanolic $H_3Co(CN)_6$ solution of Example 1A (3.01 mmol $H_3Co(CN)_6$) is added dropwise over 10 minutes to a stirred solution of zinc chloride (0.82 g, 6.0 mmol) in methanol (20 mL). A white precipitate forms as soon as the $H_3Co(CN)_6$ addition is begun. The resultant slurry is allowed to stir for 1 hour. Then, 1.0 g of an approximately 700 molecular weight glycerol propoxylate (VORANOL® 2070, Dow Chemical), 0.50 g (2.1 mmol) of 3-glycidoxypropyltri-methoxysilane and 10.0 g silica gel (Aldrich grade 62, 60–200 mesh) are added to the suspension. The resultant suspension is slowly rotated on a rotoevaporator at 70–75° C. bath temperature while the solvent is slowly distilled under slight vacuum and nitrogen sweep. The vacuum is gradually increased to 25 inches Hg, providing a free-flowing pale yellow solid (12.6 g) which is further dried in a vacuum oven at 50° C./30 inches Hg vacuum.

The amount of metal catalyst contained in the product is estimated to be 9.1%, using the method described in Example 1B.

B. Polymerization of Propylene Oxide

Supported Catalyst C is evaluated for activity in same manner as described in Example 1. At a supported catalyst loading of 8945 ppm (about 814 ppm metal cyanide catalyst), 100% conversion of the propylene oxide is seen in 18 hours. The same results are seen when 898 ppm of the supported catalyst (about 82 ppm metal cyanide catalyst) is used.

EXAMPLE 4

A. Preparation of Silane-Functional Complexing Agent A

A mixture of 0.028 g dibutyltin dilaurate and 20.0 g of a commercially available, 1775 MW poly(ethylene glycol-co-propylene glycol) monobutyl ether (SYNALOX® EPB-660, from Dow Chemical) is heated to 70° C. and flushed with nitrogen several times to remove air. 3-(Triethoxysilyl)propyl isocyanate (FW 247.37, 2.89 g, 11.7 mmol) is added dropwise over 10 minutes, and the resulting mixture is stirred at 70° C. for 15 hours. The resulting clear, colorless fluid consists primarily of a polymer of ethylene glycol and propylene glycol capped on one end with a butyl group and on the other with a (triethoxysilyl)propyl group.

B. Preparation of Supported Catalyst D 13.7 g of the methanolic $H_3Co(CN)_6$ solution of Example 1A (3.01 mmol $H_3Co(CN)_6$) is added dropwise over 10 minutes to a stirred solution of zinc chloride (0.82 g, 6.0 mmol) and Silane-Functional Complexing Agent A (3.0 g) in methanol (40 mL). A white precipitate forms as soon as the $H_3Co(CN)_6$ addition is begun. The resultant slurry is allowed to stir for 5 minutes.

Silica gel (10.0 g, Aldrich grade 62, 60–200 mesh) is then added to the suspension. The resultant suspension is slowly rotated on a rotoevaporator at 70–75° C. bath temperature while the solvent is slowly distilled under slight vacuum and nitrogen sweep. The vacuum is gradually increased to 25 inches Hg and finally to 30 inches Hg vacuum for a few minutes, ultimately providing a free-flowing pale yellow solid (14.0 g) which is further dried in a vacuum oven at 50° C./30 inches Hg vacuum.

The amount of metal catalyst contained in the product is estimated to be 8.2%, using the method described in Example 1B.

C. Polymerization of Propylene Oxide

Supported Catalyst D is evaluated for activity in same manner as described in Example 1. At a supported catalyst loading of 8782 ppm (about 720 ppm metal cyanide catalyst), 100% conversion of the propylene oxide is seen in 18 hours. When 908 ppm of the supported catalyst (about 75 ppm metal cyanide catalyst) is used, approximately 11% conversion of propylene oxide is seen in 18 hours.

EXAMPLE 5

A. Preparation of $H_3Co(CN)_6$ solution in methanol $K_3Co(CN)_6$ (20 g) is dissolved with warming (60–65° C.) in deionized water (35 g). A solution of 75% $H_2SO_4$ (12.6 g) is prepared by slowly adding 96% (concentrated) $H_2SO_4$ (9.44 g) to water (3.15 g). The 75% $H_2SO_4$ solution is added slowly dropwise over 5 minutes to the stirred warm (60–65° C.) solution of $K_3Co(CN)_6$. Immediately after the sulfuric acid addition is complete, $K_2SO_4$ starts to precipitate from the aqueous solution as a granular white solid. The resultant slurry is stirred for 10–15 min at 40–50° C.

Methanol addition (200 mL) is then begun at the same temperature. The first 15 mL of methanol is added slowly and the slurry is stirred for 5–10 minutes. The rest of the methanol charge is then added slowly over 15 minutes. After the fill methanol charge is added, the slurry is allowed to stir for 15 minutes, then is cooled to room temperature (25° C.). At this point, the methanol supernatant is separated from the granular $K_2SO_4$ solid (which rapidly settles to the bottom of the reactor), removed by filtration and saved.

The $K_2SO_4$ solid is reslurried in additional methanol (100 mL) for 5 minutes at room temperature. The methanol supernatant is separated as before and combined with that previously saved. The resultant pale yellow solution of $H_3Co(CN)_6$ in methanol is transferred to a storage bottle.

The saved methanol solution theoretically contains about 4.3 wt. % $H_3Co(CN)_6$. This methanolic solution contains some small quantity of water, as the $K_2SO_4$ does not completely dry the methanolic solution.

B. Preparation of Silane-Functional Complexing Agent B

A mixture of 0.02 g dibutyltin dilaurate and 20 g of a commercially available, 1150 MW poly(propylene glycol) monobutyl ether (SYNALOX® PB-285, from Dow Chemical) is heated to 70° C. and flushed with nitrogen several times to remove air. 3-(Triethoxysilyl)propyl isocyanate (4.58 g) is added dropwise over 20 minutes, and the resulting mixture is stirred at 70° C. for 17 hours. The resulting fluid consists primarily of a poly(propylene glycol) capped on one end with a butyl group and on the other with a (triethoxysilyl)propyl group.

C. Preparation of Supported Catalyst E 15.36 g of the methanolic $H_3Co(CN)_6$ solution of Example 5A (3.01 mmol $H_3Co(CN)_6$) is added dropwise over 10 minutes to a stirred mixture of zinc chloride (0.82 g, 6.0 mmol) and 2.0 g of Silane-Functional Complexing Agent B (Example 5B) in methanol (40 mL). A white precipitate forms as soon as the $H_3Co(CN)_6$ addition is begun. The resultant slurry is allowed to stir for 5 minutes. Silica gel (10.0 g, Aldrich grade 62, 60–200 mesh) is then added to the suspension. The resultant suspension is slowly rotated on a rotoevaporator at 70–75° C. bath temperature while the solvent is slowly distilled under slight vacuum and nitrogen sweep. The vacuum is gradually increased to 25 inches Hg and finally to 30 inches Hg vacuum for a few minutes, ultimately providing a free-flowing white solid (12.8 g). The solid is further dried in a vacuum oven at 50° C./30 inches Hg vacuum to give a pale yellow solid. The product contains approximately 8.9 wt. % of metal cyanide catalyst, bonded to the silica support by the silane-functional complexing agent.

D. Polymerization of Propylene Oxide

Supported Catalyst E is evaluated for activity in same manner as described in Example 1. At a supported catalyst loading of 8388 ppm (about 747 ppm metal cyanide catalyst), 100% conversion of the propylene oxide is seen in 18 hours. When 868 ppm of the supported catalyst (about 77 ppm metal cyanide catalyst) is used, approximately 6% conversion of propylene oxide is seen in 18 hours.

EXAMPLE 6

A. Preparation of Supported Catalyst F

About 15.36 g of the $H_3Co(CN)_6$ solution from Example 5A (3.01 mmol $H_3Co(CN)_6$) is stirred into a mixture of zinc chloride (1.026 g, 7.53 mmol), 2 g of an 8000 molecular weight bis(dimethoxymethylsilyl)-terminated poly (propylene oxide) (Aldrich catalog #45,041-3), and 20 mL of methanol. A slurry forms, which is stirred for about 10 minutes before 0.25 g of tetraethyl orthosilicate is added. After stirring another 10 minutes, the resulting slurry is added in batches to 10 g of Grade 62, 60–200 mesh silica gel particles, with periodic removal of solvent during the additions using a rotoevaporator (70–75° C./25 inches Hg vacuum). After the addition of the slurry is complete, the product is further stripped on the rotoevaporator at 70–75° C./25 inches Hg vacuum. This is followed by a few minutes at 30 inches Hg vacuum. Further drying overnight at 50° C. yields a yellow, free-flowing powder (13.23 g) containing approximately 10.2 wt % metal cyanide catalyst.

B. Polymerization of Propylene Oxide

Supported Catalyst F is evaluated for activity in same manner as described in Example 1. At a supported catalyst loading of 8392 ppm (about 858 ppm metal cyanide catalyst), 100% conversion of the propylene oxide is seen in 18 hours. When 833 ppm of the supported catalyst (about 85 ppm metal cyanide catalyst) is used, approximately 100% conversion of propylene oxide is seen in 18 hours.

EXAMPLE 7

A. Preparation of Metal Cyanide Catalyst Slurry

About 30.72 g of the $H_3Co(CN)_6$ solution from Example 5A (6.02 mmol $H_3Co(CN)_6$) is stirred into a mixture of zinc chloride (2.461 g, 18.1 mmol), 8 g of an 8000 molecular weight bis(dimethoxymethylsilyl)-terminated poly (propylene oxide) (Aldrich catalogue #45,041-3), tetraethyl orthosilicate (1.0 g, 4.8 mmol), and 30 mL of methanol. A slurry forms, which is stirred for about 10 minutes before 0.36 g of water is added. The slurry is then stirred for an additional 5–10 minutes prior to addition to the various supports. The final mass of the resultant methanolic DMC slurry is 68.8 g and contains approximately 3.12 g (4.53 wt %) of the metal cyanide catalyst.

B.1. Preparation of Supported Catalyst G

Part (20.0 g) of the resulting slurry from Example 7A is added in batches to 25 g (undried weight, including about 13% water) of 6–16 mesh, irregularly shaped silica gel chips, with periodic removal of solvent during the additions using a rotoevaporator. After the addition of the slurry is complete, the product is further stripped on the rotoevaporator at 70–75° C./25 inches Hg vacuum. This is followed by a few minutes at 30 inches Hg vacuum on the rotoevaporator. The product is further dried overnight in a vacuum oven at 50° C./<30 inches Hg vacuum. The product is 26.0 g of coated spheres, and is estimated to contain 3.5 wt. % metal cyanide catalyst (as $Zn_3[Co(CN)_6]_2 \cdot nZnCl_2$, ignoring any associated water and complexing agent). About 0.19 g of residue adheres to the walls of the reaction vessel.

A portion of Supported Catalyst G is further dried overnight at 90° C./<30 inches Hg vacuum, and is designated Supported Catalyst G-1.

B.2. Polymerization of Propylene Oxide and Catalyst Recycle

Supported Catalyst G is evaluated for activity in the same manner as described in Example 1. At a supported catalyst loading of 171,000 ppm (about 6000 ppm metal cyanide), 100% conversion of the propylene oxide is seen in 20 hours.

The catalyst is removed from the product, washed five times with hot methanol and dried in a vacuum oven. A small quantity of flaky residue appears in the washed catalyst, and is removed by filtration. Supported Catalyst G is then evaluated for activity a second time under the same polymerization conditions, except the catalyst loading is about 193,000 ppm (about 6750 ppm metal cyanide catalyst) and the polymerization time is only 4 hours. Again, 100% conversion of the propylene oxide occurs.

Supported Catalyst G is then recycled twice more in the same manner. At catalyst loadings of about 186,000 ppm (about 6500 ppm metal cyanide catalyst), 100% conversion of propylene oxide is again seen in only four hours each time.

Supported Catalyst G-1 is evaluated for activity in the manner described in Example 1, except the polymerization time is only 4 hours. At a supported catalyst loading of 68,000 ppm (about 2377 ppm metal cyanide), 93% conversion of the propylene oxide is seen in 4 hours. When recycled after washing with isopropanol and drying as described above, 89% conversion of propylene oxide is seen in 4 hours. Two additional recycles of Supported Catalyst G-1 yield propylene oxide conversions of 45% and 3%, at catalyst loadings of about 69,000 ppm (about 2424 ppm metal cyanide catalyst) and 67,000 ppm (about 2348 ppm metal cyanide catalyst), again in 4 hours.

C.1. Preparation of Supported Catalyst H

Part (20.0 g) of the slurry from Example 7A is added in batches to 25 g porous 7/32" diameter alumina spheres, with periodic removal of solvent during the additions using a rotoevaporator. After the addition of the slurry is complete, the product is further stripped on the rotoevaporator at 70–75° C./25 inches Hg vacuum. This is followed by a few minutes at 30 inches Hg vacuum on the rotoevaporator. The product is further dried overnight in a vacuum oven at 50° C./<30 inches Hg vacuum. The product is 27.7 g of coated spheres, and is estimated to contain 3.3 wt. % metal cyanide catalyst (as $Zn_3[Co(CN)_6]_2 \cdot nZnCl_2$, ignoring any associated water and complexing agent). About 0.47 g of residue adheres to the walls of the reaction vessel.

A portion of Supported Catalyst H is further dried overnight at 90° C./<30 inches Hg vacuum, and is designated Supported Catalyst H-1.

C.2. Polymerization of Propylene Oxide and Catalyst Recycle

Supported Catalyst H is evaluated for activity in the manner described in Example 1. At a supported catalyst loading of 175,000 ppm (about 5800 ppm metal cyanide), 100% conversion of the propylene oxide is seen in 20 hours. When recycled after washing with methanol and drying as described above, 94% conversion of propylene oxide is seen at a supported catalyst loading of 181,000 ppm (about 6000 ppm metal cyanide) in only 4 hours. Two additional recycles of Supported Catalyst H yield propylene oxide conversions of 93% and 93% in 4 hours, at catalyst loadings of about 193,000 ppm (about 6400 ppm metal cyanide catalyst) and 202,000 ppm (about 6700 ppm metal cyanide catalyst).

Supported Catalyst H-1 is evaluated for activity in the same manner as described in Example 1. At a supported catalyst loading of about 141,000 ppm (about 4659 ppm metal cyanide catalyst), 81% conversion of the propylene oxide is seen in 4 hours.

Supported Catalyst H-1 is then recycled ten times, being washed in isopropanol and dried each time in the manner described in Example 7.B.2. Before each recycle, any flakes that become separated from the catalyst are removed. At catalyst loadings of about 130,600 to about 145,000 ppm (about 4310–4795 ppm metal cyanide catalyst) and a polymerization time of 4 hours, successive propylene oxide conversions of 78%, 68%, 67%, 86%, 92%, 89%, 97%, 79%, 37% and 34% are seen with the recycled catalyst.

D.1. Preparation of Supported Catalyst I

Part (22.9 g) of the slurry from Example 7A is added in one portion to 10 g (undried weight) of Grade 62, 60–200 mesh silica gel particles. The solvent was then removed using a rotoevaporator, initially at 70–75° C./25 inches Hg vacuum, followed by a few minutes at 30 inches Hg vacuum on the rotoevaporator. The product is further dried overnight in a vacuum oven at 50° C./<30 inches Hg vacuum. The product is 13.6 g of pale yellow coated silica gel, and is estimated to contain 7.7 wt. % metal cyanide catalyst (as $Zn_3[Co(CN)_6]_2 \cdot nZnCl_2$, ignoring any associated water and complexing agent).

D.2. Polymerization of Propylene Oxide

Supported Catalyst I is evaluated for activity in same manner as described in Example 1. At a supported catalyst loading of 837 ppm (about 64 ppm metal cyanide catalyst), 29% conversion of the propylene oxide is seen in 18 hours.

E.1. Preparation of Catalyst Film

About 6.1 g of the catalyst slurry from Example 7A is poured in increments into the bottom of a polypropylene beaker, with solvent evaporation between each increment. The dried slurry forms a film which, after drying at 50° C./30" Hg overnight, weighs 1.07 g. A tough, non-tacky film is obtained.

E.2. Polymerization of Propylene Oxide and Catalyst Recycle

The film from Example E.1. is evaluated for activity in the same manner as described in Example 1. At a catalyst film loading of about 37,000 ppm (about 9551 ppm metal cyanide catalyst), 100% conversion of the propylene oxide is seen in 4 hours. When the catalyst film is recycled twice in the manner described in Example 7, successive propylene oxide conversions of 100% are seen, at catalyst loadings of about 35,000 ppm (about 9015 ppm metal cyanide catalyst).

EXAMPLE 8

A. Preparation of Silane-Functional Complexing Agent C

A 2300 molecular weight toluene-2,4-diisocyanate-terminated, poly(propylene glycol) polymer (10 g, 8.57 mmol NCO, 3.6 wt % isocyanate, Aldrich catalog #43,349-7) is added to a stirred vessel. 20 g of t-butanol is added, and the mixture stirred until the polymer is dissolved. A septum cap equipped with a syringe needle is fitted onto the vessel. Nitrogen is fed into the vessel through the needle inlet. 2.00 g (9.03 mmol) 3-aminopropyltriethoxysilane is added over about 20 minutes. The mixture is then stirred at room temperature for about 1½ hours. Due to a slight overcharge of the 3-aminopropyltriethoxysilane, additional toluene-2,4-diisocyanate-terminated, poly(propylene glycol) polymer (0.55 g, 0.47 mmol) is added to the solution. The final mass of the solution is 31.77 g. It contains 39.5 wt % of the adduct of the toluene diisocyanate-capped polymer and the 3-aminopropyltriethoxysilane (Silane-functional Complexing Agent C).

B. Preparation of Metal Cyanide Catalyst Slurry

About 9.00 g of a 3.66 wt % solution $H_3Co(CN)_6$ in methanol (1.51 mmol $H_3Co(CN)_6$) is stirred into a mixture of zinc chloride (0.615 g, 4.53 mmol), 5.06 g of Silane-Functional Complexing Agent C, and 6 g of methanol. A slurry forms, which is stirred for about 10 minutes before 0.1 g of water is added. The slurry is then stirred for an additional 5–10 additional minutes. The final mass of the resultant slurry is 27.6 g.

C. Preparation of Supported Catalyst J

The slurry from Example 8B is added in batches to 25.03 g of 7/16" porous alumina spheres, with periodic removal of solvent during the additions using a rotoevaporator. The spheres are rolled and shaken during the addition process to expose fresh surface to the coating process and to minimize clumping. The mixture is then dried briefly with a heat gun to yield 28.2575 g of product. The coated spheres are then cured at 90–95° C./<30 inches Hg for four hours. During the drying process, the mass of the product is reduced to 27.399 g, with an additional 0.2506 g of residue remaining on the sides of the vessel. The coated spheres are then dried an additional 8 hours in the vacuum oven to yield 27.2862 g of product, which consists of 2.2553 g of coating on the alumina support. The product is estimated to contain 2.9 wt. % metal cyanide catalyst (as $Zn_3[Co(CN)_6]_2 \cdot nZnCl_2$, ignoring any associated water and complexing agent).

D. Polymerization of Propylene Oxide and Catalyst Recycle

Supported Catalyst J is evaluated for activity in the same manner as described in Example 1. At a supported catalyst loading of about 176,000 ppm (about 5112 ppm metal cyanide catalyst), 87% conversion of the propylene oxide is seen in 4 hours. When recycled four times in the manner described in Example 7.B.2., propylene oxide conversions are 85, 86%, 83% and 85%, respectively, at supported catalyst loadings of about 171,000 in each instance.

EXAMPLE 9

A. Preparation of Supported Catalyst K 89.65 g of a 3.66 wt % solution of $H_3Co(CN)_6$ in methanol (15.05 mmol $H_3Co(CN)_6$) is added over 15 minutes to a stirred mixture of $ZnCl_2$ (6.15 g, 45.2 mmol), 25.0 g of an 8000 molecular weight bis(dimethoxymethylsilyl)-terminated poly(propylene oxide) (Aldrich catalog #45,041-3) and 15 g tetraethyl orthosilicate (15.0 g) in 150 mL methanol. A slurry forms immediately. After stirring the slurry for 15 minutes, water (5.2 g) is added and the mixture stirred for 5 minutes. The final mass of the resultant slurry is approximately 253.3 g. The mixture consists of a very finely divided translucent white suspension of catalyst in methanol.

The slurry is then added in small batches over about 110 minutes to 150 g silica gel (60–200 mesh particles, 150A pore size, Aldrich catalog #24,3998-1) while the flask is occasionally swirled and shaken to allow the silica to be uniformly wetted. The silica is stripped on a rotoevaporator at 70–75° C. bath temp and 25 inches Hg vacuum once during the coating process, after approximately two-thirds of the total slurry is added. After the slurry is added the silica is further dried on the rotoevaporator at 70–75° C. bath temp and 25 inches Hg vacuum, then finally at 70–75° C. bath temp (>30 inches Hg vacuum) for approximately 10–15 min.

The product is further dried in a vacuum oven at full pump vacuum (90–95° C./<30 in Hg vacuum) for 14 hours. The resultant product weighs 181.42 g and contains approximately 4.2% catalyst (as $Zn_3[Co(CN)_6]_2 \cdot nZnCl_2$, ignoring any associated water and complexing agent).

B. Polymerization of Propylene Oxide and Catalyst Recycle

Supported Catalyst K is evaluated for activity in the same manner as described in Example 1. At a supported catalyst loading of about 23,585 ppm (about 1012 ppm metal cyanide catalyst), 99% conversion of the propylene oxide is seen in 18 hours. At a supported catalyst loading of about 2389 ppm (about 102 ppm metal cyanide catalyst), 53% conversion of the propylene oxide is seen in 18 hours.

EXAMPLE 10

A. Preparation of Supported Catalyst L 86.09 g of a 3.81 wt % solution of $H_3Co(CN)_6$ in methanol (15.05 mmol $H_3Co(CN)_6$) is added over 15 minutes to a stirred mixture of $ZnCl_2$ (6.15 g, 45.2 mmol), 25.0 g of an 8000 molecular weight bis(dimethoxymethylsilyl)-terminated poly(propylene oxide) (Aldrich catalog #45,041-3), and 15 g tetraethyl orthosilicate (15.0 g) in 150 mL methanol. A slurry forms immediately. After stirring the slurry for 15 minutes, water (5.2 g) is added and the mixture stirred for 5 minutes. The final mass of the resultant slurry is approximately 253.1 g.

The slurry is then added in small batches over about 2 hours to 250 g silica (grade 15,30–60 mesh, Aldrich Catalog #21,331-8) while the flask is occasionally swirled and shaken to allow the silica to be uniformly wetted. The silica is stripped on a rotoevaporator at 70–75° C. bath temp and 25 inches Hg vacuum several times during the coating process. After the slurry is added, the silica is further dried on the rotoevaporator at 70–75° C. bath temp and 25 inches Hg vacuum, then finally at 70–75° C. bath temp (>30 inches Hg vacuum) for approximately 30–45 min.

The product is further dried in a vacuum oven at full pump vacuum (90–95° C./>30 in Hg vacuum) for 15 hours. As continued mass loss is seen, the product is further dried under the same conditions for 42 more hours. The resultant product weighs about 279.2 g, and contains approximately 2.8% catalyst (as $Zn_3[Co(CN)_6]_2 \cdot nZnCl_2$, ignoring any associated water and complexing agent).

B. Polymerization of Propylene Oxide

Supported Catalyst L is evaluated for activity in the same manner as described in Example 1. At a supported catalyst loading of about 36,000 ppm (about 1000 ppm metal cyanide catalyst), 99% conversion of the propylene oxide is seen in 18 hours. At a supported catalyst loading of about 3678 ppm (about 103 ppm metal cyanide catalyst), 30% conversion of the propylene oxide is seen in 18 hours.

EXAMPLE 11

A. Preparation of Supported Catalyst M

About 35.87 g of a 3.66 wt % solution of $H_3Co(CN)_6$ in methanol (6.02 mmol $H_3Co(CN)_6$) is stirred over 15 minutes into a mixture of zinc chloride (2.461 g, 18.1 mmol), 8 g of an 8000 molecular weight bis(dimethoxymethylsilyl)-terminated poly(propylene oxide) (Aldrich catalyst #45,041-3), tetraethyl orthosilicate (2.0 g, 9.6 mmol) and 50 mL of methanol. A slurry forms, which is stirred for about 15 minutes before 0.7 g of water is added. The mass of the resultant catalyst slurry is about 90.3 g and contains approximately 3.12 g (4.53 wt %) of the metal cyanide catalyst. 100 grams of Alcoa Selexsorb CD alumina absorbent spheres (2.0 mm) are placed into a ceramic dish lined with aluminum foil. The catalyst slurry is added in portions to the catalyst spheres over 70 minutes while the temperature of the spheres is maintained at about 60–85° C. with a hot air gun. During the slurry addition, the spheres are stirred periodically to expose fresh surface to the slurry. Between each increment of slurry, the spheres are permitted to dry before the next increment of slurry is added. After the slurry addition is complete, hot air (about 70° C. ) is blown over the spheres for about 1.5 hours. The resulting coated spheres are dried overnight in a vacuum oven at 50° C./<30 inches Hg vacuum, dried another 2 hours at 70° C. under vacuum, dried at 50° C./<30 inches Hg vacuum overnight, and then 4 more hours at 70° C. The resulting coated spheres weigh 118.79 g.

B. Polymerization of Propylene Oxide

Supported Catalyst M is evaluated for activity in same manner as described in Example 1, except the polymerization time is only four hours. At a supported catalyst loading of 85,000 ppm (about 2378 ppm metal cyanide catalyst), 100% conversion of the propylene oxide is seen. When recycled as described in Example 7B, 100% conversion is achieved at a supported catalyst loading of about 86,000 ppm. When recycled a second time in the same manner, 68% conversion of propylene oxide is achieved at a supported catalyst loading of about 87,000 ppm.

EXAMPLE 12

A. Preparation of Catalyst Film A1

Zinc chloride (0.615 g) is dissolved in 7.5 mL of methanol and transferred to a small jar containing a magnetic stirrer and 2 g of an 8000 molecular weight bis (dimethoxymethylsilyl)-terminated poly(propylene oxide) (Aldrich Cat. #45,041-3). Tetraethyl orthosilicate (0.5 g) is added and stirred in. The resulting mixture is then added dropwise over 5–10 minutes to a stirred bottle containing about 7.68 g of an $H_3Co(CN)_6$ solution prepared as in Example 5A. A fine white precipitate forms. The jar that contained the zinc chloride solution is rinsed three times with about 1.5 g each of methanol, with the rinse added to the stirred bottle containing the catalyst slurry. The bottle is stirred for about 30–45 minutes at room temperature.

About 0.1 g of water is added to the slurry, and the mixture stirred for about 1 minute and weighed. About one-half of the slurry is poured into a polystyrene Petri dish in small portions over about 30 minutes, each time allowing the slurry to evaporate to a film before adding the next portion. The poured slurry is then allowed to dry at ambient temperature for a period, then the remaining one-half of the slurry is poured into the Petri dish in the same fashion. The resulting film is permitted to dry at room temperature for six hours, and then air dried in a vacuum overnight at 60–65° C. The resulting film is weighed and peeled from the Petri dish. About 3.03 g of a pale yellow, pliable, rubber film is obtained that does not crack when flexed. It contains about 27% metal cyanide catalyst (as $Zn_3[Co(CN)_6]_2 \cdot nZnCl_2$, ignoring any associated water and complexing agent).

B. Preparation of Catalyst Films A2, A3 and A4

Catalyst Film A2 is made in the same manner as Catalyst Film A1, except the amount of tetraethyl orthosilicate is reduced to 0.125 g. The product is a pale yellow, pliable, rubber film containing about 28% metal cyanide catalyst (as $Zn_3[Co(CN)_6]_2 \cdot nZnCl_2$, ignoring any associated water and completing agent).

Catalyst Film A3 is made in the same manner as Catalyst Film A1, except the amount of bis(dimethoxymethylsilyl)-terminated poly(propylene oxide) is reduced to 0.5 g. The product is a dark brown film with extensive cracking and peeling. It is easily crumbled into fine flakes or powder. The product contains about 56% metal cyanide catalyst (same basis as before).

Catalyst Film A4 is made in the same manner as Catalyst Film A1, except the amount of bis(dimethoxymethylsilyl)-terminated poly(propylene oxide) is reduced to 0.5 g and the amount of tetraethyl orthosilicate is reduced to 0.125 g. The product resembles Catalyst Film A3 and contains about 60% metal cyanide catalyst (same basis as before).

C. Polymerization of Propylene Oxide

Catalyst Films A1–A4 are evaluated by adding 0.12 g of a 700 MW poly(propylene oxide) triol, 0.58 g propylene oxide and about 550 parts of the catalyst film per million parts of combined weight of initiator and propylene oxide in a sealed vial, and heating at 90° C. for 20 hours. The conversion of the propylene oxide is then determined as an indication of the activity of the catalyst. Propylene oxide conversions are 44% for Catalyst Film A1, 27% for Catalyst Film A2, 100% for Catalyst Film A3 and 58% for Catalyst Film A4.

EXAMPLE 13

A. Preparation of Catalyst Films B1–B4

Catalyst Films B1–B4 are made in the same manner as are Catalyst Films A1–A4, respectively, except an 800 molecular weight bis(dimethoxymethylsilyl)-terminated poly (propylene oxide) is used instead of the 8000 molecular weight bis(dimethoxymethylsilyl)-terminated poly (propylene oxide) that is used in making Catalyst Films A1–A4.

Catalyst Films B1 and B2 are transparent, colorless rubbery films containing 27 and 28%, respectively, of the metal cyanide catalyst. Catalyst Films B3 and B4 are brown, extensively cracked and peeling films containing 56 and 60%, respectively, of the metal cyanide catalyst. Catalyst Films B3 and B4 are easily crumbled into fine flakes.

B. Polymerization of Propylene Oxide

These catalyst films are tested as described in Example 12C. Propylene oxide conversions are 32% for Catalyst Film B1, 30% for Catalyst Film B2, 64% for Catalyst Film B3 and 59% for Catalyst Film B4.

EXAMPLE 14

A. Preparation of Catalyst Films C1–C4

Catalyst Films C1–C4 are made in the same manner as are Catalyst Films A1–A4, respectively, except Silane-functional Complexing Agent B is used instead of the 8000 molecular weight bis(dimethoxymethylsilyl)-terminated poly(propylene oxide) that is used in making Catalyst Films A1–A4.

Catalyst Films C1 and C2 are waxy polymers that form a poor quality, slightly tacky film. They contain 27 and 28%, respectively, of the metal cyanide catalyst. Catalyst Films C3 and C4 are brown, extensively cracked and peeling films containing 56 and 60%, respectively, of the metal cyanide catalyst. Catalyst Films C3 and C4 are easily crumbled into fine flakes.

B. Polymerization of Propylene Oxide

Catalyst Films C1–C4 are tested as described in Example 12C. Propylene oxide conversions are 79% for Catalyst Film C1, 91% for Catalyst Film C2, 99% for Catalyst Film C3 and 24% for Catalyst Film C4.

EXAMPLE 15

A. Preparation of Catalyst Films D1–D4

Catalyst Films D1–D4 are made in the same general manner as are Catalyst Films A1–A4, respectively, except the bis(dimethoxymethylsilyl)-terminated poly(propylene oxide) is replaced with the silane-functional Complexing Agent C Solution from Example 8.A. 7n making Catalyst Films D1 and D2, about 5.1 g of this solution is used. In making Catalyst Films D3 and D4, about 1.27 g of this complexing agent solution is used. In addition, 9 g of an approximately 3.66 wt-% solution of $H_3Co(CN)_6$ is used instead of the $H_3CO(CN)_6$ solution of Example 5A.

Catalyst Films D1 and D2 are transparent, pale yellow rubbery films. They contain 27 and 28%, respectively, of the metal cyanide catalyst. Catalyst Films D3 and D4 are brown, extensively cracked and peeling films containing 56 and 60%, respectively, of the metal cyanide catalyst. Catalyst Films D3 and D4 are easily crumbled into fine flakes.

B. Polymerization of Propylene Oxide

Catalyst Films D1–D4 are tested as described in Example 12.C. Propylene oxide conversions are 22% for Catalyst Film D1, 25% for Catalyst Film D2, 54% for Catalyst Film D3 and 54% for Catalyst Film D4.

EXAMPLE 16

A. Preparation of Catalyst Films E1–E4

Catalyst Films E1–E4 are made in the same general manner as are Catalyst Films A1–A4, respectively. The 8000 molecular weight bis(dimethoxy-methylsilyl)-terminated poly(propylene oxide) used in making Catalyst Films A1–A4 is replaced with a 2-[methoxy (polyethylene oxy) propyl] trimethoxysilane having a molecular weight of about 460–590. In addition, 9 g of an approximately 3.66 wt-% solution of $H_3Co(CN)_6$ is used instead of the $H_3Co(CN)_6$ solution of Example 5.A Catalyst films E1 and E2 are waxy polymers that form a poor quality, slightly tacky film. They contain 30 and 31%, respectively, of the metal cyanide catalyst. Catalyst Films E3 and E4 are glassy polymers that are difficult to remove from the Petri dish. They contain 59 and 63%, respectively, of the metal cyanide catalyst.

B. Polymerization of Propylene Oxide

Catalyst Films E1–E4 are tested as described in Example 12.C. Propylene oxide conversions are 43% for Catalyst Film E1, 49% for Catalyst Film E2, 72% for Catalyst Film E3 and 100% for Catalyst Film E4.

EXAMPLE 17

A. Preparation of Silane-Functional Complexing Agent D

A toluene-2,4-diisocyanate-terminated, 1600 molecular weight poly(tetra-methylene oxide) polymer (10 g, 11.90 mmol NCO) is melted and added to a stirred vessel. 30 g of t-butanol is added, and the mixture stirred until the polymer is dissolved. A septum cap equipped with a syringe is fitted onto the vessel. Nitrogen is fed into the vessel through the syringe. 2.66 g (12.02 mmol) 3-aminopropyltriethoxysilane is added over about 30 minutes. The mixture is then stirred at room temperature for about 1 hour, then warmed slightly with a heat gun to provide a solution that is cloudy at room temperature. The final mass of the solution is 42.63 g. It contains 29.7% of the adduct of the toluene diisocyanate-capped polymer and the 3-aminopropyltriethoxysilane (Silane-functional Complexing Agent D).

B. Preparation of Catalyst Films F1–F4

Catalyst Films F1–F4 are made in the same general manner as are Catalyst Films A1–A4, respectively, with the following exceptions. The bis(dimethoxy-methylsilyl)-terminated poly(propylene oxide) is replaced with the Silane-Functional Complexing Agent D solution from part A above. In making Catalyst Films F1 and F2, about 6.7 g of this solution is used. In making Catalyst Films F3 and F4, about 1.68 g of this solution is used. In addition, 9 g of an approximately 3.66 wt-% solution of $H_3Co(CN)_6$ is used instead of the $H_3Co(CN)_6$ solution of Example 5A.

The catalyst slurries for Films F1 and F2 gel. They are transferred to a Petri dish and broken up with a spatula, and then dried with a heat gun to remove solvent and further dried in a vacuum oven overnight. Catalyst Films F3 and F4 are made in the same manner as Catalyst Films A3 and A4, respectively.

Catalyst Films F1 and F2 form pliable, tough polymers containing 27 and 28%, respectively, of the metal cyanide catalyst. Catalyst Films F3 and F4 are brown, extensively cracked and peeled films that are easily crushed to form fine flakes or powder.

C. Polymerization of Propylene Oxide

Catalyst Films F1–F4 are tested as described in Example 12.C. Propylene oxide conversions are 23% for Catalyst Film F1, 29% for Catalyst Film F2, 92% for Catalyst Film F3 and 98% for Catalyst Film F4.

EXAMPLE 18

A. Preparation of Catalyst Films G1–G4

Catalyst Films G1–G4 are made in the same general manner as are Catalyst Films A1–A4, respectively, with the following exceptions. The bis(dimethoxymethylsilyl)-terminated poly(propylene oxide) is replaced with a solution containing 78.6% t-butanol and 21.4% of a 3140 molecular weight adduct of 3-aminopropyltriethoxysilane and a toluene diisocyanate-capped poly(ethylene adipate). In making Catalyst Films E1 and E2, about 9.35 g of this solution is used. In making Catalyst Films E3 and E4, about 2.34 g of this solution is used. In addition, 9 g of an approximately 3.66 wt-% solution of $H_3Co(CN)_6$ is used instead of the $H_3Co(CN)_6$ solution of Example 5.A.

Catalyst Films F1–F4 are all crumbly, particulate polymers that contain 27, 28, 56 and 60 weight percent metal cyanide catalyst, respectively.

B. Propylene Oxide Polymerizations

These catalyst films are tested as described in Example 12.C. Propylene oxide conversions are 57% for Catalyst Film G1, 35% for Catalyst Film G2, 91% for Catalyst Film G3 and 49% for Catalyst Film G4.

EXAMPLE 19

A. Preparation of Silane-Functional Complexing Agent E

Boron trifluoride etherate (FW 141.93, 1.20 g, 8.45 mmol) is added to tert-butanol (FW 74.12, 187.9 g, 2.535 mol) which has been previously heated to 32–33 ° C. and evacuated/nitrogen refilled several times to remove air. 3-Glycidoxypropyl-trimethoxysilane (FW 236.34, 50.07 g, 0.212 mol) is then added dropwise over 30 minutes. The reaction temperature remains in the range of 33–35° C. throughout the addition without any additional heating. The mixture is stirred for an additional 45 minutes, cooled to ambient temperature and stirred under a pad of nitrogen for 4 days. The excess tert-butanol is them removed on a rotoevaporator at 60° C. (29–30 inches Hg vacuum). The oil is further stripped at 60° C. (30 inches Hg vacuum) for 20 minutes to yield a clear, colorless oil (56.10 g), consisting primarily of 3-tert-butoxy-2-hydroxypropyl 3-triethoxysilyl ether (FW 310.46) but which may contain higher oligomes or other condensation products.

B. Preparation of Catalyst Film H 9 g of a 3.66 wt % solution of $H_3Co(CN)_6$ in methanol (1.51 mmol $H_3Co(CN)_6$) is added over 7 minutes to a stirred mixture of 0.615 g (4.53 mmol), $ZnCl_2$ and 2.0 g (6.44 mmol) of 3-t-butoxy-2-hydroxypropyl 3-trimethoxysilyl ether (from part A) in 4 g methanol. A slurry forms immediately. After stirring the slurry for 10 minutes, water (0.35 g) is added and the mixture is stirred for 5 minutes. The final mass of the resultant slurry is approximately 18.4 g.

The slurry is added in small portions over 15 minutes to a polystyrene Petri dish while hot air from a heat gun is blown over the surface to evaporate the solvent. The resulting film is allowed to dry under a slight hot air flow for about 10 minutes. The resulting film cracks easily, although it is tacky to the touch. It is air dried for 2 hours and then dried in a vacuum oven (50° C. , 30 inches Hg) for 45 minutes. The film is then dried overnight at 90° C./30 inches Hg to yield 2.451 g of a brittle film containing 34% by weight metal catalyst.

C. Polymerization of Propylene Oxide and Catalyst Recycle

Catalyst Film H is tested as described in Example 12.C. At a catalyst loading of 578 ppm (about 197 ppm of metal cyanide catalyst), propylene oxide conversion of 90% is seen in 20 hours.

EXAMPLE 20

A. Preparation of Catalyst Film I 9 g of a 3.66 wt % solution of $H_3Co(CN)_6$ in methanol (1.51 mmol $H_3Co(CN)_6$) is added over 7 minutes to a stirred mixture of 0.615 g (4.53 mmol), ZnCl$_2$ and 2.0 g (6.09 mmol) diethylphosphatoethyl triethoxysilane (Gelest Catalog # SID3412.0) in 4 g methanol. A slurry forms immediately. After stirring the slurry for 10 minutes, water (0.35 g) is added and the mixture is stirred for 5 minutes. The final mass of the resultant slurry is approximately 19.9 g.

A portion of the slurry is added in small portions over 15 minutes to a polystyrene Petri dish while hot air from a heat gun is blown over the surface to evaporate the solvent. The resulting film is allowed to dry under a slight hot air flow for about 10 minutes. The resulting film cracks easily, although it is tacky to the touch. It is air dried for an hour and then dried for 8 hours in a vacuum oven (90° C., 30 inches Hg). The film is then dried overnight at 90° C./30 inches Hg to yield 2.451 g of a brittle film containing 34% by weight metal catalyst. 2.01 g of a highly cracked, glassy film containing about 37.5% of the metal cyanide catalyst is obtained.

B. Polymerization of Propylene Oxide and Catalyst Recycle

Catalyst Film I is tested as described in Example 12.C. At a film loading of 557 ppm (about 209 ppm of metallic cyanide catalyst), propylene oxide conversion of 63% is seen in 20 hours.

EXAMPLE 21

A. Preparation of Supported Catalyst N 17.22 g of a 3.81 wt % solution of H$_3$Co(CN)$_6$ in methanol (3.01 mmol H$_3$Co(CN)$_6$) is added over 10 minutes to a stirred mixture of ZnCl$_2$ (1.23 g, 9.03 mmol) and 5.0 g of 3-glycidoxypropyltrimethoxysilane (Aldrich Catalog #44,016-7) in 20 mL methanol. A slurry forms immediately, and is stirred for 15 minutes. The final mass of the resultant slurry is approximately 42.4 g.

The slurry is then added in small batches over about 1.5 hours to 50 g silica (grade 15, 30–60 mesh, Aldrich Catalog # 21,331-8) while the flask is occasionally swirled and shaken to allow the silica to be uniformly wetted. The silica is stripped on a rotoevaporator at 70–75° C. bath temp and 25 inches Hg vacuum twice during the coating process. After the slurry is added, the silica is further dried on the rotoevaporator at 70–75° C. bath temp and 25 inches Hg vacuum, then finally at 70–75° C. bath temp (>30 inches Hg vacuum) for approximately 15–20 min.

The product is further dried in a vacuum oven at full pump vacuum (90–95° C./>30 in Hg vacuum) for 15.5 hours. The resultant product weighs about 53.75 g, and contains approximately 2.9% catalyst (as Zn$_3$[Co(CN)$_6$]$_2$.nZnCl$_2$, ignoring any associated water and complexing agent).

B. Polymerization of Propylene Oxide

Supported Catalyst N is evaluated for activity in the same manner as described in Example 1. At a supported catalyst loading of about 34,200 ppm (about 992 ppm metal cyanide catalyst), 100% conversion of the propylene oxide is seen in 18 hours. At a supported catalyst loading of about 3478 ppm (about 101 ppm metal cyanide catalyst), 39% conversion of the propylene oxide is seen in 18 hours.

EXAMPLE 22

A. Preparation of Silane-Functional Complexing Agent F

VORANOL® 2070 polyol (10.0 g, 14.29 mmol) is purged with nitrogen several times to remove air, and then heated to 30° C. Boron trifluoride etherate (FW 141.93, 0.39 g, 2.75 mmol) is added, providing a clear, colorless solution. 3-Glycidoxypropyltrimethoxysilane (FW 236.34, 13.60 g, 57.54 mmol) is then added dropwise to the polyol/BF$_3$.OEt$_2$ mixture over 45 minutes. The reaction temperature remains at 33–36° C. throughout the silane addition without any additional heating. The mixture is allowed to stir for an additional 10 minutes, at which point the temperature has dropped to 31° C. At this point, additional BF$_3$.OEt$_2$ (0.11 g, 0.78 mmol) is added. An additional exotherm ensues, with the reaction temperature slowly increasing to a maximum of 40° C. over 5–10 minutes. The mixture likewise increases in viscosity and within a few minutes turns into a soft, pasty gel-like fluid which is not stirrable. The gel is allowed to cool to room temperature and react overnight.

Methanol (30 mL) is added and the mixture is slowly warmed to 30° C. to dissolve the gel-like fluid and diluted with an additional 20 mL of methanol. The total mass of the methanolic solution is 56.13 g, which contains 42.0 wt % product.

B. Preparation of Supported Catalyst O

A methanolic solution of H$_3$Co(CN)$_6$ (17.22 g of 3.81 wt % solution, 3.01 mmol) is added over 10 minutes to a stirred mixture of ZnCl$_2$ (1.23 g, 9.03 mmol), 11.90 g of the 42.0% solution of Silane-Functional Ligand F and 15 mL methanol. A precipitate forms, and the resulting slurry is stirred for 15 minutes. The slurry is then added to 50 g of silica gel (grade 15,30–60 mesh, Aldrich Catalog #21,331-8) in small batches over an hour with occasional light agitation to allow the silica to be uniformly wetted with the slurry. The slurry/silica gel mixture is stripped on a rotoevaporator at 70–75° C. bath temp (25–30 inches Hg vacuum) twice during the coating process. After the entire addition is complete, the silica is further dried on the rotoevaporator at 70–75° C. bath temp (25 inches Hg vacuum), then finally at 70–75° C. bath temp (>30 inches Hg vacuum) for approximately 45 min.

The slightly off-white, product is further dried in a vacuum oven at full pump vacuum (90–95° C./>30 in Hg vacuum) for 15 hours. The resultant off-white product (54.09 g final mass) contains about 2.88 weight % metal cyanide catalyst (as as Zn$_3$[Co(CN)$_6$]$_2$.nZnCl$_2$, ignoring any associated water and complexing agent).

C. Propylene Oxide Polymerization

Supported Catalyst O is evaluated for activity in the same manner as described in Example 1, except the reaction time is 21 hours. At a supported catalyst loading of about 34,797 ppm (about 1002 ppm metal cyanide catalyst), 91% conversion of the propylene oxide is seen in 21 hours. At a supported catalyst loading of about 3657 ppm (about 105 ppm metal cyanide catalyst), 16% conversion of the propylene oxide is seen in 21 hours.

What is claimed is:

1. A catalyst complex comprising a water insoluble metal cyanide catalyst that is complexed with a silane-functional complexing agent.

2. The catalyst complex of claim 1, which is represented by the general formula

$$M_b[M^1(CN)_r(X)_t]_c[M^2(X)_6]_d \cdot zL \cdot nM^3_xA_y$$

wherein M is a metal ion that forms an insoluble precipitate with the M$^1$(CN)$_r$(X)$_t$ group and which has at least one salt that is soluble in water or an organic compound;

M$^1$ and M$^2$ are transition metal ions that may be the same or different;

each X independently represents a group other than cyanide that coordinates with an M$^1$ or M$^2$ ion;

M$^3_x$A$_y$ represents salt of metal ion M$^3$ and anion A that is soluble in water or an organic compound, wherein M$^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2;

n is a positive number indicating the relative quantity of $M^3_xA_y$;

L represents the silane-functional complexing agent and z is a positive number representing the relative quantity of complexed L molecules.

3. The catalyst complex of claim 2 wherein the silane-functional complexing agent has at least one hydrolyzable silane group that is linked to a group having at least one functional moiety, wherein the functional moiety contains at least one oxygen, nitrogen, phosphorous or sulfur atom.

4. The catalyst complex of claim 3 wherein the silane-functional complexing agent is represented by the general structure

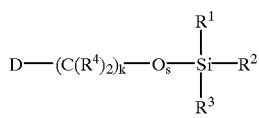

where D is a heteroatom containing group, s is zero or one, k is a positive number, each $R^4$ is independently hydrogen or an alkyl, aryl or alkoxyl group that may be substituted, $R^1$ is a hydrolyzable group and $R^2$ and $R^3$ are groups that may be hydrolyzable or nonhydrolyzable.

5. The catalyst complex of claim 4 wherein D is an ether, polyether, or hydroxyl group, s is zero and at least one of $R^2$ and $R^3$ is hydrolyzable.

6. The catalyst complex of claim 3 wherein M is zinc, $M^1$ is cobalt or iron and d is zero.

7. The catalyst complex of claim 6 wherein $M^3_xA_y$ is zinc chloride, $M^1$ is cobalt, r is 6 and t is zero.

8. The catalyst complex of claim 5 wherein D includes a polyether segment derived from ethylene oxide, propylene oxide, butylene oxide, tetramethylene oxide or mixtures of two or more of these, and having a weight (number average) of from about 200 daltons, to about 3000 daltons.

9. The catalyst complex of claim 3 wherein the silane-functional complexing agent is a reaction product of an epoxy-functional silane and an alcohol.

10. The catalyst complex of claim 8 wherein said polyether segments are connected to the $—(C(R^4)_2)_kO_s—SiR^1R^2R^3$ group through a urethane or urea group.

11. A method of making an organosilicone polymer, comprising hydrolyzing a precipitated water-insoluble metal cyanide catalyst complexed with a silane-functional complexing agent to form an organosilicone polymer having heteroatom-containing pendant groups that are complexed with a water-insoluble metal cyanide catalyst.

12. The method of claim 11 wherein the heteroatom-containing groups contain at least one oxygen, nitrogen, phosphorous or sulfur atom.

13. The method of claim 12 wherein said pendant groups have the general structure $D—(C(R^4)_2)_k—O_s—$ where D is the heteroatom containing group, k is a positive number, s is zero or one and each $R^4$ is independently hydrogen or an alkyl, aryl or alkoxyl group that may be substituted.

14. The method of claim 13 wherein D is an ether, polyether, or hydroxyl group and s is zero.

15. The method of claim 14 wherein the metal cyanide catalyst is represented by the general formula

wherein M is a metal ion that forms an insoluble precipitate with the $M^1(CN)_r(X)_t$ group and which has at least one salt that is soluble in water or an organic compound;

$M^1$ and $M^2$ are transition metal ions that may be the same or different;

each X independently represents a group other than cyanide that coordinates with an $M^1$ or $M^2$ ion;

$M^3_xA_y$ represents a salt of metal ion $M^3$ and anion A that is soluble in water or an organic compound, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2; and n is a positive number indicating the relative quantity of $M^3_xA_y$.

16. The method of claim 15 wherein M is zinc, $M^1$ is cobalt or iron and d is zero.

17. The method of claim 16 wherein $M^3_xA_y$ is zinc chloride, $M^1$ is cobalt, r is 6 and t is zero.

18. The method of claim 13 which is performed in the presence of a support.

19. The method of claim 15 which is performed in the presence of a support.

20. The method of claim 17 which is performed in the presence of a support.

21. The method of claim 11 which is performed in the presence of a support.

22. A polymer containing repeating units derived from a complex of a water-insoluble metal cyanide and a silane-functional complexing agent.

23. A supported catalyst complex comprising a water-insoluble metal cyanide coupled to a support through a silane coupling agent containing a heteroatom-containing functional group that is complexed with said metal cyanide.

24. The supported catalyst complex of claim 23 wherein the silane coupling agent forms one or more Si—O-surface bonds to the support.

25. A method of polymerizing an alkylene oxide, comprising contacting said alkylene oxide with an initiator compound under polymerization conditions in the presence of a polymer containing repeating units derived from a complex of a water insoluble metal cyanide and a silane-functional complexing agent.

26. A method of polymerizing an alkylene oxide, comprising contacting said alkylene oxide with an initiator compound under polymerization conditions in the presence of a catalytically effective amount of an organosilicone polymer having heteroatom-containing pendant groups that are complexed with a water-insoluble metal cyanide catalyst.

27. A method of making a polymerization catalyst, comprising a) precipitating a metal cyanide catalyst having the general structure

wherein M is a metal ion that forms an insoluble precipitate with the $M^1(CN)_r(X)_t$ group and which has at least one salt that is soluble in water or an organic compound;

$M^1$ and $M^2$ are transition metal ions that may be the same or different;

each X independently represents a group other than cyanide that coordinates with an $M^1$ or $M^2$ ion;

$M^3_xA_y$ represents a salt of metal ion $M^3$ and anion A that is soluble in water or an organic compound, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2; and n is a positive number indicating the relative quantity of $M^3{}_xA_y$;

b) treating said metal cyanide catalyst with a silane-functional complexing agent having a silane atom bonded to at least one hydrolyzable group, c) subjecting said treated catalyst to conditions sufficient to hydrolyze said hydrolyzable group to form an organosilicone polymer having pendant groups complexed with said metal cyanide catalyst.

28. The method of claim 27, wherein step c is performed in the presence of a support.

29. A method of making a supported catalyst comprising applying a dispersion of a precipitated water-insoluble metal cyanide catalyst and a silane-functional complexing agent onto the surface of a support and hydrolyzing the silane-functional complexing agent in the presence of the support to form an organosilicone polymer having heteroatom-containing pendant groups that are complexed with the water-insoluble metal cyanide catalyst.

30. A method of making a supported catalyst comprising applying a dispersion of a water-insoluble metal cyanide catalyst and a silane-functional complexing agents onto the surface of a support and hydrolyzing the silane-functional complexing agent in the presence of the support to form a polymer containing repeating units derived from a complex of a water insoluble metal cyanide and a silane-functional complexing agent.

31. A method of polymerizing an alkylene oxide, comprising contacting said alkylene oxide with an initiator compound under polymerization conditions in the presence of a catalytically effective amount of a supported catalyst made by applying a dispersion of a water-insoluble metal cyanide catalyst and a silane-functional complexing agents onto the surface of a support and hydrolyzing the silane-functional complexing agent in the presence of the supported to form a polymer containing repeating units derived from a complex of a water insoluble metal cyanide and a silane-functional complexing agent.

* * * * *